US012006842B1

(12) United States Patent
Kim et al.

(10) Patent No.: US 12,006,842 B1
(45) Date of Patent: Jun. 11, 2024

(54) AIRFOIL WITH SANDWICH COMPOSITE

(71) Applicant: RAYTHEON TECHNOLOGIES CORPORATION, Farmington, CT (US)

(72) Inventors: Russell Kim, Temecula, CA (US); Raymond Surace, Newington, CT (US); James T. Roach, Vernon, CT (US); Jonas Banhos, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/328,177

(22) Filed: Jun. 2, 2023

(51) Int. Cl.
*F01D 5/28* (2006.01)
*F01D 5/14* (2006.01)

(52) U.S. Cl.
CPC ............. *F01D 5/282* (2013.01); *F01D 5/147* (2013.01); *F01D 5/284* (2013.01); *F05D 2240/80* (2013.01); *F05D 2250/283* (2013.01); *F05D 2300/6033* (2013.01); *F05D 2300/612* (2013.01)

(58) Field of Classification Search
CPC ...... F01D 5/282; F01D 5/284; F05D 2240/80; F05D 2250/283; F05D 2300/612
See application file for complete search history.

(56) References Cited

U.S. PATENT DOCUMENTS

| | | | | |
|---|---|---|---|---|
| 8,734,605 | B2 | 5/2014 | Harrison | |
| 9,739,157 | B2 * | 8/2017 | Uskert | F01D 5/282 |
| 9,957,980 | B2 | 5/2018 | Englebert | |
| 11,168,568 | B2 | 11/2021 | Theertham | |
| 11,773,740 | B2 * | 10/2023 | Duchatelle | F01D 5/147 416/219 R |

* cited by examiner

*Primary Examiner* — Christopher R Legendre
(74) *Attorney, Agent, or Firm* — Carlson, Gaskey & Olds, P.C.

(57) ABSTRACT

An airfoil for a gas turbine engine includes an airfoil section and a platform that has a non-gaspath side and a gaspath side from which the airfoil section extends. The platform is comprised of a sandwich composite that has first and second ceramic matrix composite (CMC) skins that each include at least one 2-D ceramic fiber ply. The first and second CMC skins are disposed, respectively, on the gaspath side and the non-gaspath side, and there is a cellular core disposed radially between the first and second CMC skins.

14 Claims, 6 Drawing Sheets

AIRFOIL WITH SANDWICH COMPOSITE

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

An airfoil for a gas turbine engine according to an example of the present disclosure includes an airfoil section and a platform having a non-gaspath side and a gaspath side from which the airfoil section extends. The platform is comprised of a sandwich composite having first and second ceramic matrix composite (CMC) skins each having at least one 2-D ceramic fiber ply. The first and second CMC skins are disposed, respectively, on the gaspath side and the non-gaspath side, and there is a cellular core disposed radially between the first and second CMC skins.

In a further embodiment of any of the foregoing embodiments, the cellular core is selected from the group consisting of a honeycomb, a foam, a ceramic felt, a 3-D fabric, a monolithic ceramic grid, and combinations thereof.

In a further embodiment of any of the foregoing embodiments, the cellular core is selected from the group consisting of a honeycomb, a foam, a monolithic ceramic grid, and combinations thereof.

In a further embodiment of any of the foregoing embodiments, the first and second CMC skins turn from the platform and converge with each other into the airfoil section.

In a further embodiment of any of the foregoing embodiments, the cellular core extends into the airfoil section.

In a further embodiment of any of the foregoing embodiments, the cellular core includes cells that are void.

In a further embodiment of any of the foregoing embodiments, the cellular core includes cells that include a filler material.

In a further embodiment of any of the foregoing embodiments, the filler material is selected from the group consisting of a monolithic ceramic and a fibrous ceramic.

In a further embodiment of any of the foregoing embodiments, the cellular core has a contoured surface profile, and at least one of the first or second CMC skins conforms to the contoured surface profile.

In a further embodiment of any of the foregoing embodiments, the contoured surface profile is on the gaspath side of the cellular core.

In a further embodiment of any of the foregoing embodiments, the cellular core has a first contoured surface profile on the gaspath side of the cellular core, a second contoured profile on the non-gaspath side of the cellular core, the first CMC skin conforms to the first contoured surface profile, and the second CMC skin conforms to the second contoured surface profile.

In a further embodiment of any of the foregoing embodiments, the second contoured surface profile tracks the first contoured surface profile.

In a further embodiment of any of the foregoing embodiments, the second contoured surface profile mirrors the first contoured surface profile.

A gas turbine engine according to an example of the present disclosure includes a compressor section, a combustor in fluid communication with the compressor section, and a turbine section in fluid communication with the combustor. The turbine section has an airfoil according to any of the foregoing embodiments.

A method for fabricating an airfoil for a gas turbine engine according to an example of the present disclosure includes providing a core blank made of a cellular material, shaping the core blank into a cellular core, forming a fiber preform that has an airfoil section and a platform by laying-up first and second ceramic fiber ply skins on the cellular core such that in the platform the cellular core is sandwiched radially between the first and second ceramic fiber ply skins, the first and second ceramic fiber ply skins each including at least one 2-D ceramic fiber ply, and then densifying the fiber preform with a ceramic matrix.

In a further embodiment of any of the foregoing embodiments, the core blank is selected from the group consisting of a honeycomb, a foam, a ceramic felt, a 3-D fabric, a monolithic ceramic grid, and combinations thereof.

In a further embodiment of any of the foregoing embodiments, the shaping includes machining the core blank.

In a further embodiment of any of the foregoing embodiments, the machining forms a contoured surface profile on the cellular core, and the first ceramic fiber ply skin conforms to the contoured surface profile.

In a further embodiment of any of the foregoing embodiments, the machining forms first and second contoured surface profiles on, respectively, a gaspath side of the cellular core and a non-gaspath side of the cellular core. The first ceramic fiber ply skin conforms to the first contoured surface profile, and the second ceramic fiber ply skin conforms to the second contoured surface profile.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

Figure 1:
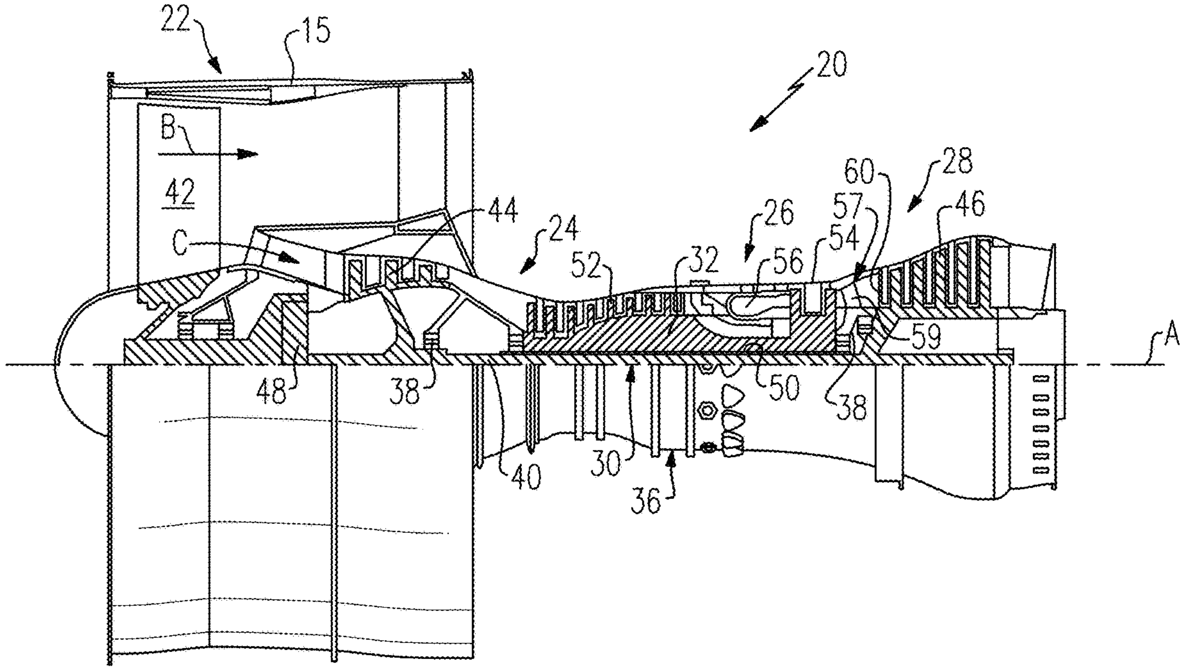
FIG. 1 illustrates a gas turbine engine.

In this disclosure, like reference numerals designate like elements where appropriate and reference numerals with the addition of one-hundred or multiples thereof designate modified elements that are understood to incorporate the same features and benefits of the corresponding elements. Terms such as "first" and "second" used herein are to differentiate that there are two architecturally distinct components or features. Furthermore, the terms "first" and "second" are interchangeable in that a first component or feature could alternatively be termed as the second component or feature, and vice versa.

DETAILED DESCRIPTION

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC)"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
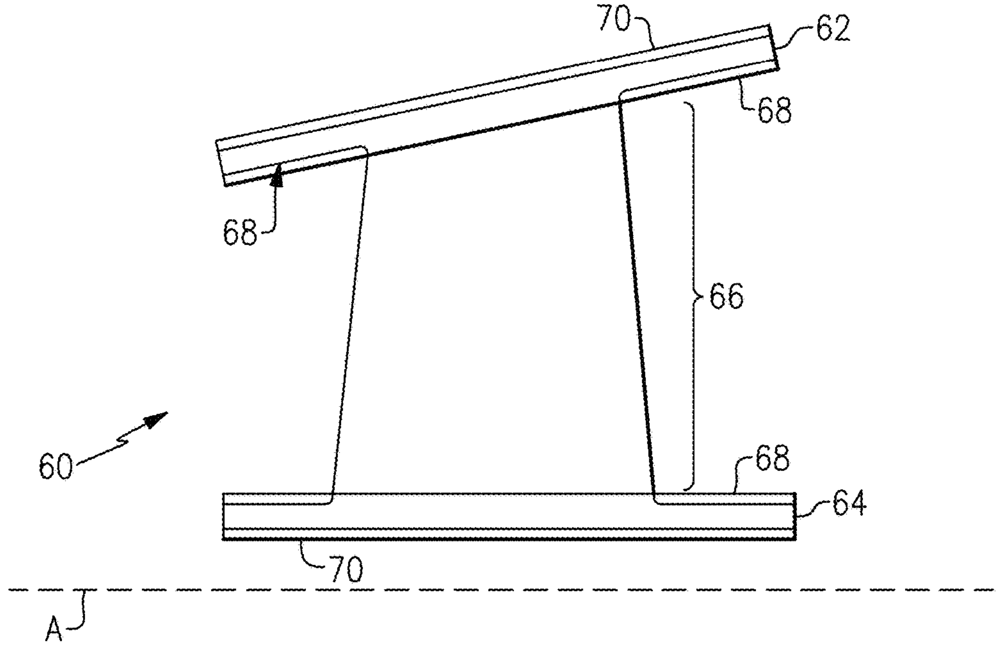
FIG. 2 illustrates an airfoil from the turbine section of the engine.

FIG. 2 illustrates an article 60 from the engine 20 (see also FIG. 1). To demonstrate an example implementation in accordance with this disclosure, the article 60 is depicted as a turbine vane from the turbine section 28 of the engine 20. A plurality of the turbine vanes are arranged in a circumferential row about the engine central longitudinal axis A. It is to be understood, however, that the airfoil 60 is not limited to vanes and that the examples herein may also be applied to turbine blades.

The turbine vane is comprised of several sections, including first and second platforms 62/64 and an airfoil section 66 that extends between the platforms 62/64. Each platform 62/64 has a gaspath side 68 and a non-gaspath side 70. The gaspath side 68 bounds a portion of the core flow path C of the engine 20, while the non-gaspath side 70 is the opposite side that faces away from the core flow path C. The airfoil section 66 extends between the gaspath sides 68 and generally defines a leading edge, a trailing edge, and pressure and suction sides. In this example, the first platform 62 is a radially outer platform and the second platform 64 is a radially inner platform.

Airfoils that are made of ceramic matrix composite ("CMC") materials must be designed with a geometry that is not only aerodynamically efficient but that is also manufacturable from the CMC material. Such a balance has proven challenging, as many features that are known for use in metallic alloy vanes cannot be manufactured from CMC materials. Furthermore, as designs for ceramic airfoils evolve and improve, the geometry challenges the limits of ceramic manufacturability. For instance, a CMC airfoil may be formed of a lay-up of ceramic fabric plies to form a preform. The preform is then subjected to a densification process to form the ceramic matrix. Such a densification process may include, but is not limited to, chemical vapor infiltration, melt infiltration, or polymer infiltration and pyrolysis. In these regards, the densification depends to some extent on the ability of the matrix material or matrix precursor material (i.e., infiltrants) to flow into all depths of the preform during the densification process so that the preform becomes fully densified. In some cases, however, the thickness of the preform exceeds a depth at which the infiltrants can readily flow under practical processing conditions and times and achieve the desired density. As a result, the preform becomes only partially densified, with pores or voids in the regions that the infiltrant cannot reach. To facilitate addressing this issue, the platforms 62/64 of the airfoil 60 are made from a sandwich composite. As will be described below, the sandwich composite enables use of a thicker wall while eliminating or reducing concerns over partial densification.

Figure 3:
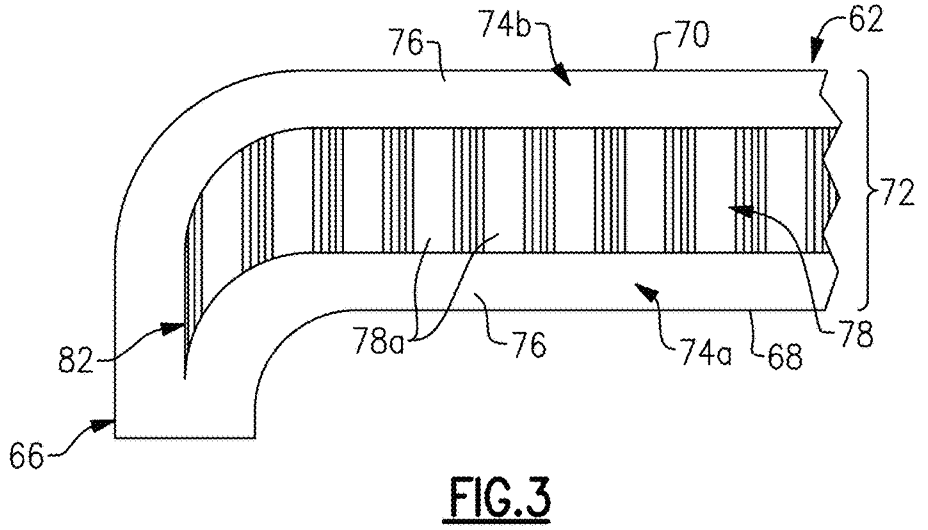
FIG. 3 illustrates a sandwich composite of the airfoil.

FIG. 3 illustrates a representative portion of the airfoil 60, sectioned through the platform 62 and a part of the airfoil section 66. Although not shown, the platform 64 may be of the same construction as described for the platform 62. The platform 62 is comprised of a sandwich composite 72. A sandwich composite is a composite material that has a cellular core disposed between two generally thin face skins, where the skins and the cellular core are of different materials in terms of the material architecture, though the chemical compositions may be the same or similar between the skins and core.

In the example depicted, the sandwich composite 72 includes first and second ceramic matrix composite (CMC) skins 74*a*/74*b*. Each CMC skin 74*a*/74*b* includes at least one 2-D ceramic fiber ply 76. In a 2-D ceramic fiber ply, the ceramic fibers or tows are interlaced in only two directions. Example ceramic materials of the CMC include silicon-containing ceramic, such as but not limited to, silicon carbide (SiC) and/or silicon nitride ($Si_3N_4$). A CMC is formed of ceramic fiber tows that are disposed in a ceramic matrix. As an example, the CMC may be, but is not limited to, a SiC/SiC composite in which SiC fiber tows are disposed within a SiC matrix.

The CMC skins 74*a*/74*b* are disposed, respectively, on the gaspath side 68 and the non-gaspath side 70 of the platform 62. The CMC skins 74*a*/74*b* turn from the platform 62 and converge with each other into the airfoil section 66. A cellular core 78 is disposed radially between the CMC skins 74*a*/74*b*. A cellular core 78 is a material that has a cellular macro-architecture, such as but not limited to, an open or closed cell foam that has random irregularly shaped cells, a honeycomb that has uniformly shaped cells (e.g., circular, hexagonal, etc.), or a fibrous material in which the interstices between fiber tows define cells. In the illustrated example, the cellular core 78 is of the honeycomb type and defines an array of cells 78*a* that are void, i.e., empty, although in some examples the cells 78*a* may be filled or partially filled.

Figure 4:
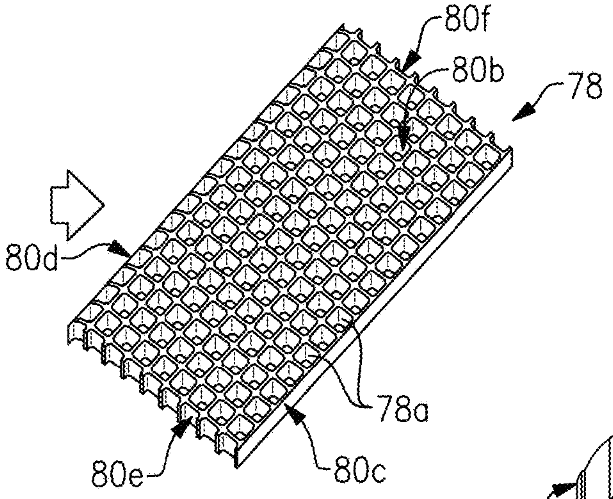
FIG. 4 illustrates a cellular core of the sandwich composite.
Figure 5:
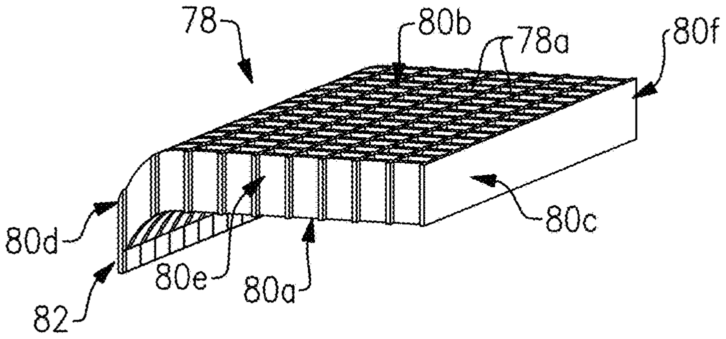
FIG. 5 illustrates another view of the cellular core of FIG. 4.

FIGS. 4 and 5 illustrate isolated view of the cellular core 78. In this example, the cells 78*a* are rectangular (e.g., square), are open radially at both ends, and are of uniform size throughout the array. The cross-sectional shape of the cells 78*a*, however, may alternatively be another polygonal shape, circular, or oval. Additionally, the size of the cells 78*a* may be varied across the array. For instance, in one region the cells 78*a* may be of relatively larger size and in another region the cells 78*a* may be of a relatively smaller size. The size and shape of the cells 78*a* may be selected to locally tailor the properties of the cellular core 78 (and thus also the platform 62). Additionally, the cellular core 78 could be excluded in some regions of the platform 62, while other regions include the core 78.

The geometry of the cellular core 78 defines a cellular core profile that has first and second opposed sides 80*a*/80*b*, first and second axial ends 80*c*/80*d* (axial relative to the engine axis A), and first and second lateral sides 80*e*/80*f*. The CMC skins 74*a*/74*b* conform to the sides 80*a*/80*b* and are in contact with the edges of the cells 78*a*. In this example, the sides 80*a*/80*b*/80*c*/80*e*/80*f* are substantially flat such that the CMC skins 74*a*/74*b*, and thus the gaspath and non-gaspath sides 68/70, are also flat. The sides 80*c*/80*e*/80*f* are oriented substantially orthogonal to sides 80*a*/80*b*. As used herein, the term "substantially" refers to variations within manufacturing tolerances. For instance, the sides 80*c*/80*e*/80*f* may be orthogonal to sides 80*a*/80*b* within +/−5°. In this example, the second end 80*d* of the cellular core 78 defines a tail 82. The tail 82 is a curved, tapered projection that extends radially at the end 80*d*. As shown in FIG. 3, the tail 82 extends into the airfoil section 66. The extension into the airfoil section 66 facilitates stabilizing and stiffening the cellular core 78.

Figure 6:
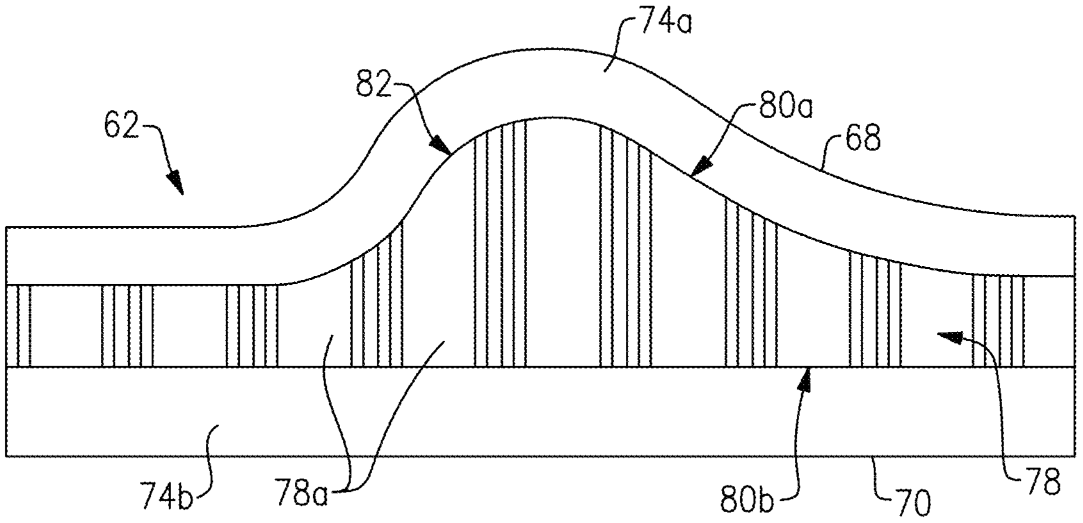
FIG. 6 illustrates a sandwich composite that has a cellular core with a contoured surface profile on the gaspath side.

Although the sides 80*a*/80*b* are flat in the illustrated example, they may be contoured as in the example shown in FIG. 6. In this example, the side 80*a* of the cellular core 78 has a contoured surface profile 82 at which the cellular core 78 is locally radially convex. The CMC skin 74*a* conforms to the contoured surface profile 82 such that the contour is replicated on the gaspath side 68 of the platform 62. Accordingly, the cellular core 78 may be designed with aerodynamic contours to concomitantly produce the aerodynamic contours on the gaspath side 68 for the core gas flow. Although the contoured surface profile 82 is shown on the gaspath side 68 of the cellular core 78, it is to be understood that a contoured surface profile could alternatively or additionally be provided on the non-gaspath side 70 of the cellular core 78, to provide aerodynamic contouring for flow outside of the core gaspath.

Figure 7:
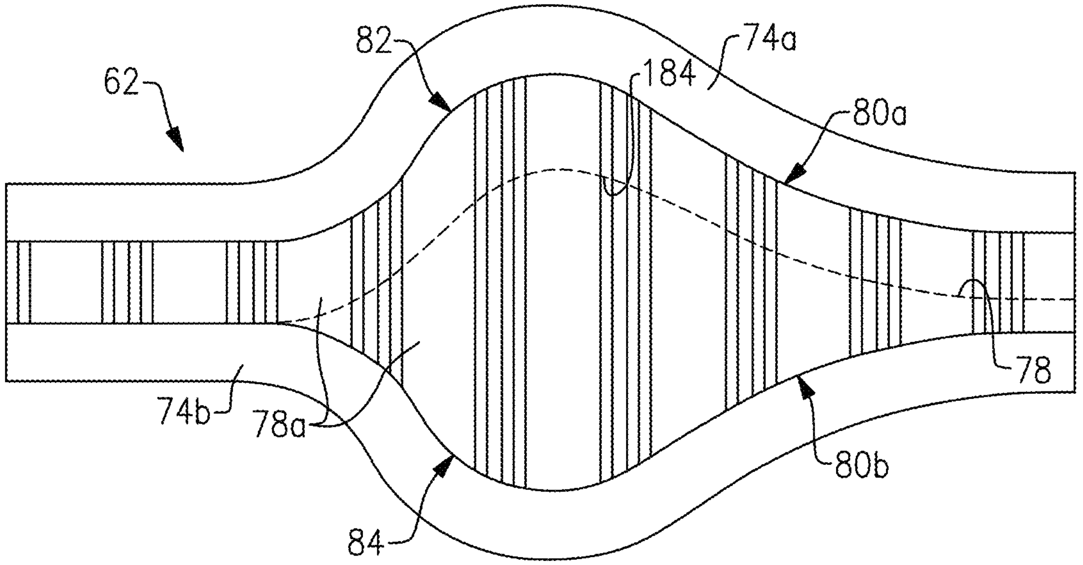
FIG. 7 illustrates a sandwich composite that has a cellular core with a contoured surface profile on the gaspath and non-gaspath sides.

For example, as shown in FIG. 7, the non-gaspath side 70 of the cellular core 78 also has a contoured surface profile 84 at which the cellular core 78 is locally radially convex. For instance, the contoured surface profile 84 is located opposite the contoured surface profile 82 and mirrors the profile 82. The CMC skin 74*b* conforms to the contoured surface profile 84 such that the contour is replicated on the non-gaspath side 70 of the platform 62. In this regard, the cellular core 78 is locally thick across the profiles 82/84, while the surrounding regions of the platform 62 are locally thin. Alternatively, as depicted at 184, rather a convex shape, the contoured surface profile 184 may be concave such that it tracks the contoured surface profile 82 and the cellular core 78 maintains a substantially constant thickness across the profiles 82/184. It is to be appreciated that the contoured surface profile 82 may alternatively be concave in the examples above.

Figure 8:
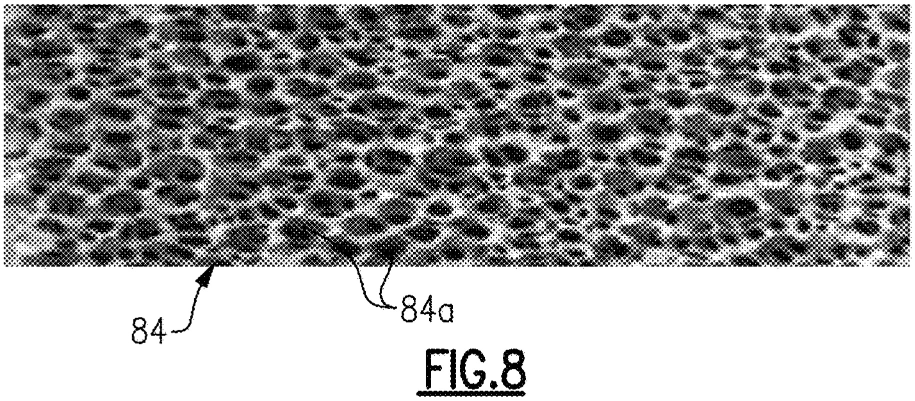
FIG. 8 illustrates a foam of a cellular core.
Figure 9:
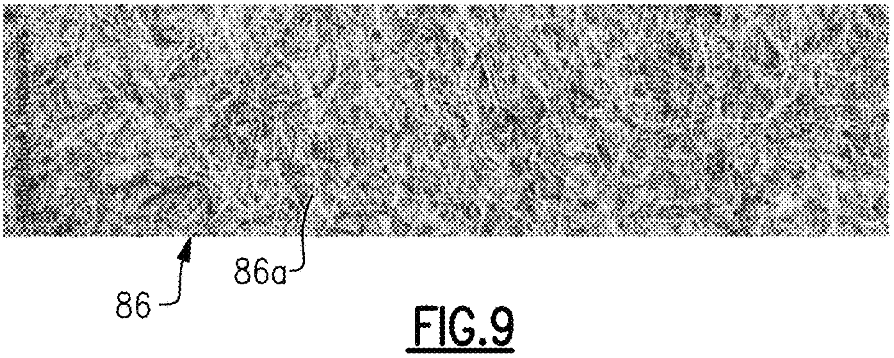
FIG. 9 illustrates a ceramic felt of a cellular core.
Figure 10:
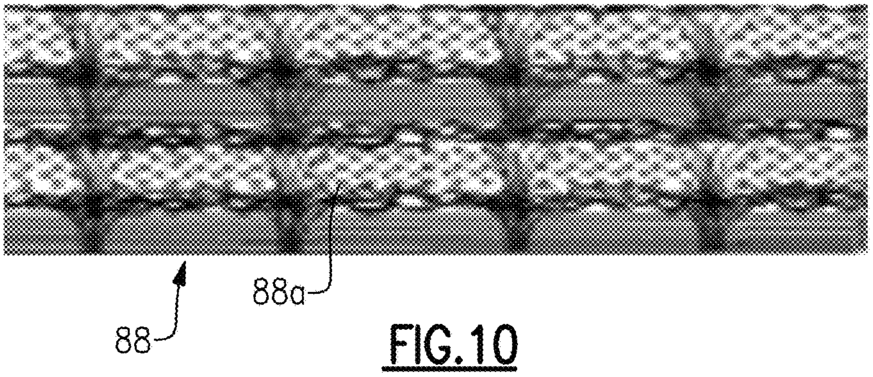
FIG. 10 illustrates a 3-D fabric of a cellular core.
Figure 11:
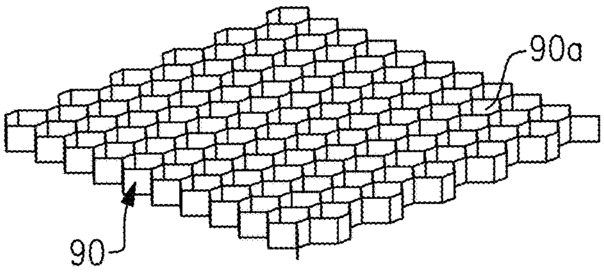
FIG. 11 illustrates a monolithic ceramic honeycomb of a cellular core.

The cellular core 78 of the examples herein may be formed of a material selected from a honeycomb, a foam, a ceramic felt, a 3-D fabric, a monolithic ceramic grid, or combinations thereof. For instance, the cellular core 78 above with the rectangular cells 78*a* may be formed from a layup of 2-D ceramic fabric that is constructed into the honeycomb shape and then densified with ceramic matrix. If not formed to net shape, the cellular core 78 may be machined to the desired profile. Alternatively, the cellar core 78 is a foam 84 with cells 84*a* as shown in FIG. 8; a ceramic felt 86 with cells 86*a* as shown in FIG. 9; a 3-D fabric 88 with cells 88*a* (between fiber tows) as shown in FIG. 10; or a monolithic ceramic grid 90 with cells 90*a* as shown in FIG. 11. In further examples, the foam 84 is a ceramic foam or reticulated vitreous carbon foam.

Figure 12:
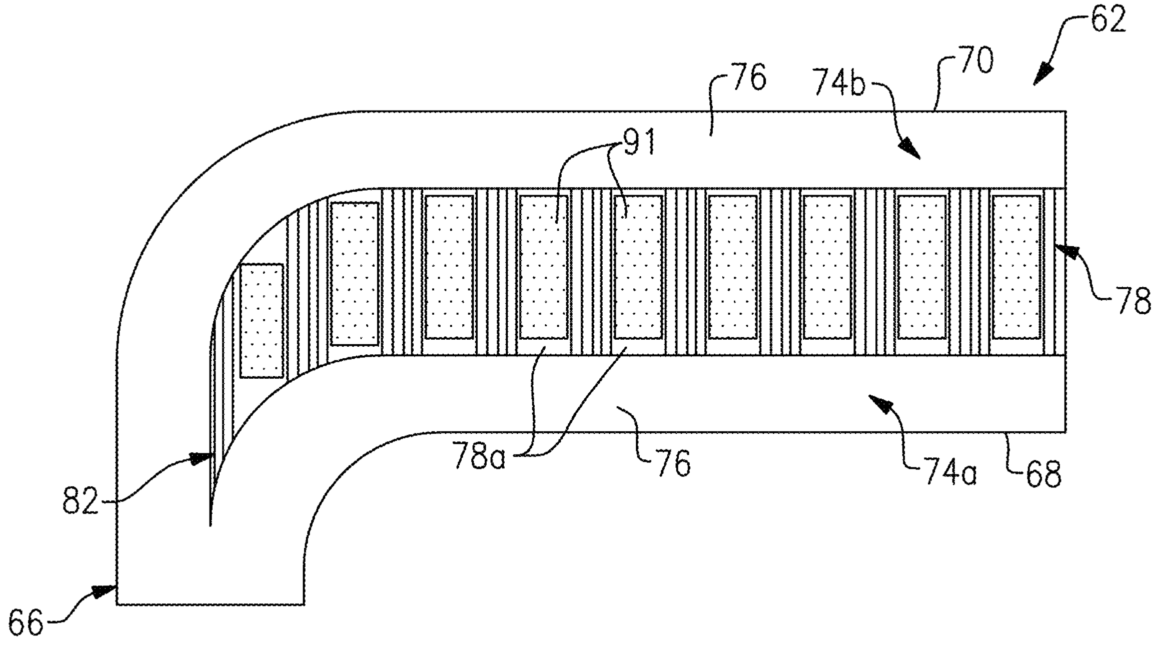
FIG. 12 illustrates a cellular core with a filler material in the cells.

As indicated previously, the cells 78*a* may be void (empty). However, as shown in FIG. 12, the cells 78*a* may alternatively include a filler material 91 that fully or partially fills the volume of the cells 78*a*. For example, the filler material 91 is a monolithic ceramic or a fibrous ceramic. The filler material 91 may serve to reinforce the cellular core 78, thus providing additional mechanical properties to the platform 62. As will be appreciated, all of the cells 78*a* need not include the filler material 91, and the filler material 91 may be provided selectively in regions of the platform 62 that require different properties than other regions of the platform 62.

Figure 13:
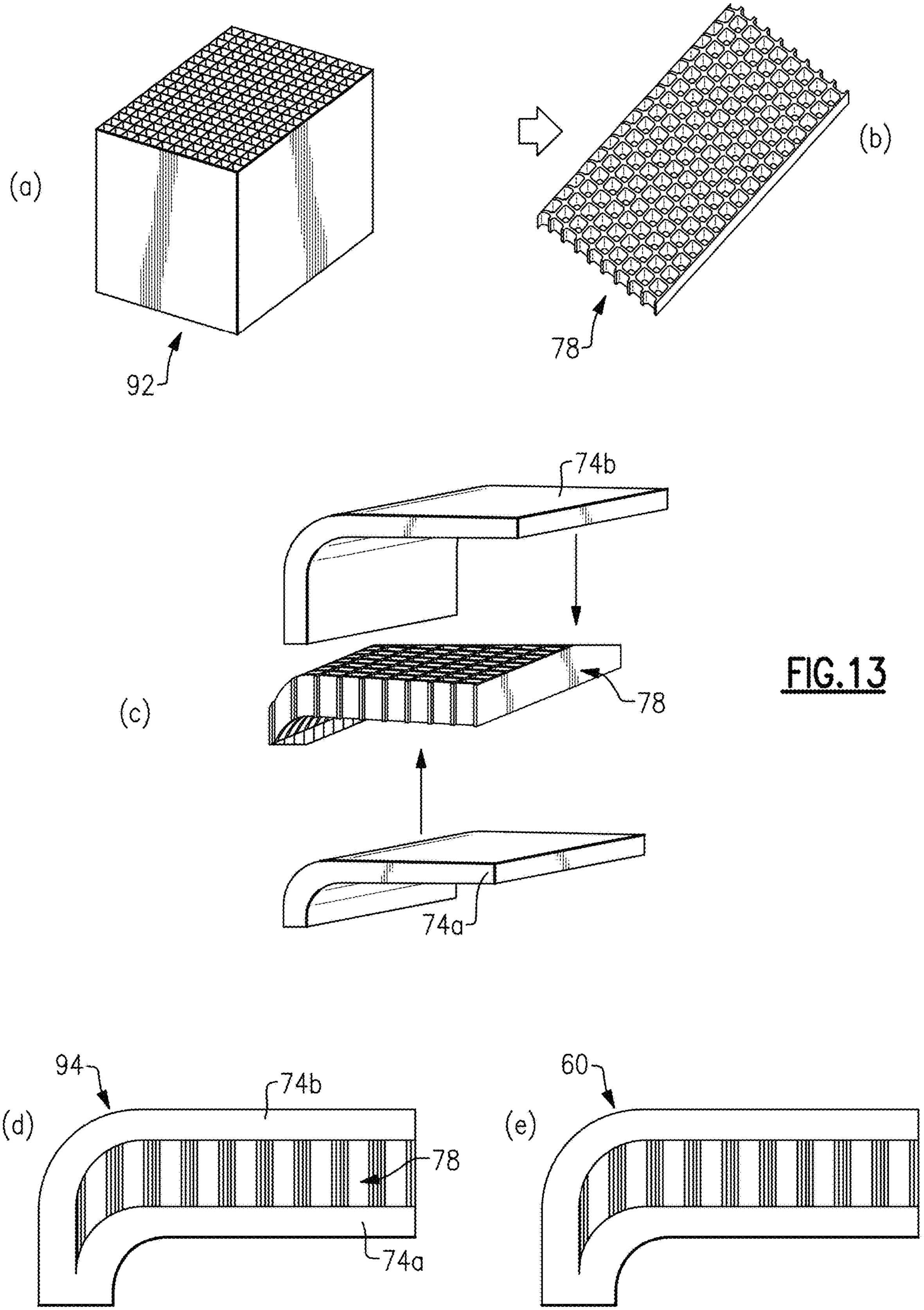
FIG. 13 illustrates a method for fabricating an airfoil with a sandwich composite.

FIG. 13 depicts a method for fabricating the airfoil 60 of the prior examples. At stage (a) a core blank 92 made of the cellular material is provided. For instance, the core blank 92 is selected from a honeycomb, a foam, a ceramic felt, a 3-D fabric, a monolithic ceramic grid, or combinations thereof, as also discussed above. The core blank 92 may be preformed as a block, for example. Techniques for fabricating the core blank 92 are not particularly limited and may include, but are not limited to, ply layup, 3-D printing, 3-D weaving, or milling or ultrasonic impact machined monolithic ceramic.

At stage (b) the core blank 92 is shaped into the cellular core 78. For instance, the shaping includes machining or cutting the core blank 92 to the desired geometry of the cellular core 78, which may include forming the aforementioned contoured surface profiles. At stage (c) a fiber preform 94 is formed by laying-up first and second ceramic fiber ply skins 74*a*/74*b* (i.e., the fiber plies prior to densification to form the CMC skins 74*a*/74*b*) on the cellular core 78 such that the cellular core 78 is sandwiched radially between the skins 74*a*/74*b*. At stage (d) the fiber preform 94 is densified with a ceramic matrix to form the airfoil 60 at stage (e). For instance, although not limited, the densification may include, polymer infiltration and pyrolysis, slurry infiltration, melt infiltration, or chemical vapor infiltration. Machining or other finishing process may be conducted after densification.

The cellular core 78 facilitates densification in that the cells of the core 78, to the extent they are open, provide pathways for flow of ceramic matrix material or precursor material, enabling densification of the fiber ply skins 74*a*/74*b*. In this manner, issues of infiltration through a thick wall for densification are avoided, yet the platform can still be of substantial thickness. Of course, if the cells are closed or pre-filled with the filler material 91, such pathways may be limited. In some instances, it may be desirable to control or limit flow through the cells 78*a* during densification. In this regard, the filler material 91 may be used to limit or control flow and/or a densification process may be selected for tailoring flow. As an example, slurry or melt infiltration may not infiltrate as readily as gases in chemical vapor infiltration and may be used in conjunction with the filler material 91 to reduce flow into or through the cells 78*a*.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil for a gas turbine engine comprising:
an airfoil section; and
a platform having a non-gaspath side and a gaspath side from which the airfoil section extends, the platform being comprised of a sandwich composite including first and second ceramic matrix composite (CMC) skins each including at least one 2-D ceramic fiber ply, the first and second CMC skins being disposed, respectively, on the gaspath side and the non-gaspath side, and a cellular core disposed radially between the first and second CMC skins.

2. The airfoil as recited in claim 1, wherein the cellular core is selected from the group consisting of a honeycomb, a foam, a ceramic felt, a 3-D fabric, a monolithic ceramic grid, and combinations thereof.

3. The airfoil as recited in claim 1, wherein the cellular core is selected from the group consisting of a honeycomb, a foam, a monolithic ceramic grid, and combinations thereof.

4. The airfoil as recited in claim 1, wherein the first and second CMC skins turn from the platform and converge with each other into the airfoil section.

5. The airfoil as recited in claim 1, wherein the cellular core extends into the airfoil section.

6. The airfoil as recited in claim 1, wherein the cellular core includes cells that are void.

7. The airfoil as recited in claim 1, wherein the cellular core includes cells that include a filler material.

8. The airfoil as recited in claim 7, wherein the filler material is selected from the group consisting of a monolithic ceramic and a fibrous ceramic.

9. The airfoil as recited in claim 1, wherein the cellular core has a contoured surface profile, and at least one of the first or second CMC skins conforms to the contoured surface profile.

10. The airfoil as recited in claim 9, wherein the contoured surface profile is on the gaspath side of the cellular core.

11. The airfoil as recited in claim 1, wherein the cellular core has a first contoured surface profile on the gaspath side of the cellular core, a second contoured profile on the non-gaspath side of the cellular core, the first CMC skin conforms to the first contoured surface profile, and the second CMC skin conforms to the second contoured surface profile.

12. The airfoil as recited in claim 11, wherein the second contoured surface profile tracks the first contoured surface profile.

13. The airfoil as recited in claim 11, wherein the second contoured surface profile mirrors the first contoured surface profile.

14. A gas turbine engine comprising:

a compressor section;

a combustor in fluid communication with the compressor section; and a turbine section in fluid communication with the combustor, the turbine section having an airfoil including an airfoil section, and a platform having a non-gaspath side and a gaspath side from which the airfoil section extends, the platform being comprised of a sandwich composite including first and second ceramic matrix composite (CMC) skins each including at least one 2-D ceramic fiber ply, the first and second CMC skins being disposed, respectively, on the gaspath side and the non-gaspath side, and a cellular core disposed radially between the first and second CMC skins.

* * * * *